(12) United States Patent
Christiansson et al.

(10) Patent No.: US 9,760,233 B2
(45) Date of Patent: Sep. 12, 2017

(54) EFFICIENT TOMOGRAPHIC PROCESSING FOR TOUCH DETERMINATION

(71) Applicant: FlatFrog Laboratories AB, Lund (SE)

(72) Inventors: Tomas Christiansson, Torna-Hallestad (SE); Andreas Björklund, Lund (SE); Mats Petter Wallander, Lund (SE); Nicklas Ohlsson, Bunkeflostrand (SE)

(73) Assignee: FLATFROG LABORATORIES AB, Lund (SE)

(*) Notice: Subject to any disclaimer, the term of this patent is extended or adjusted under 35 U.S.C. 154(b) by 406 days.

(21) Appl. No.: 14/384,001

(22) PCT Filed: Mar. 7, 2013

(86) PCT No.: PCT/SE2013/050198
§ 371 (c)(1),
(2) Date: Sep. 9, 2014

(87) PCT Pub. No.: WO2013/133757
PCT Pub. Date: Sep. 12, 2013

(65) Prior Publication Data
US 2015/0035774 A1    Feb. 5, 2015

Related U.S. Application Data

(60) Provisional application No. 61/608,745, filed on Mar. 9, 2012.

(30) Foreign Application Priority Data

Mar. 9, 2012 (SE) .................................. 1250220-9

(51) Int. Cl.
*G06F 3/041* (2006.01)
*A61B 6/03* (2006.01)
(Continued)

(52) U.S. Cl.
CPC ............ *G06F 3/046* (2013.01); *G06F 3/0416* (2013.01); *G06F 3/0421* (2013.01); *G06F 2203/04109* (2013.01)

(58) Field of Classification Search
CPC .......... G06F 3/041; G06F 3/042; G06F 3/044; G06F 3/048
See application file for complete search history.

(56) References Cited

U.S. PATENT DOCUMENTS 4,891,829 A * 1/1990 Deckman ............. G01N 23/046
378/19
6,380,740 B1 * 4/2002 Laub .................... G01R 33/4822
324/307
(Continued)

FOREIGN PATENT DOCUMENTS

WO    WO-2009/048365 A1    4/2009
WO    WO-2010/006882 A2    1/2010
(Continued)

OTHER PUBLICATIONS

Natterer, F. and F. Wübbeling. *Mathematical Methods in Image Reconstruction* (2001): Chapter 5.2 "Fourier Rernnstruction", pp. 100-109.
(Continued)

*Primary Examiner* — Ilana Spar
*Assistant Examiner* — Nguyen H Truong
(74) *Attorney, Agent, or Firm* — Harness, Dickey & Pierce, PLC

(57) ABSTRACT

Touch sensitivity is enabled using a touch system that comprises a panel configured to conduct signals, e.g. by TIR, along detection lines across a touch surface. A signal processor operates to generate data samples indicative of transmitted signal energy on parallel detection lines at a number of different angles across the touch surface; process the data samples for generation of interpolated Fourier coefficients at (Continued)

grid points in a regular grid in a Fourier domain; and operate a two-dimensional inverse Fourier transform on the interpolated Fourier coefficients so as to generate an interaction pattern for the touch surface. The interpolated Fourier coefficients are generated sequentially for individual groups of grid points. Each individual group comprises grid points that have equal distance to an origin in the regular grid, e.g. grid points that are mapped onto each other by one or ore lines of symmetry in the regular grid. The group-based processing may improve processing speed and/or reduce the need for data storage.

19 Claims, 9 Drawing Sheets

(51) Int. Cl.
*G06F 3/046* (2006.01)
*G06F 3/042* (2006.01)

(56) References Cited

U.S. PATENT DOCUMENTS

| | | |
|---|---|---|
| 6,972,753 B1 | 12/2005 | Kimura et al. |
| 7,432,893 B2 | 10/2008 | Ma et al. |
| 8,274,495 B2 | 9/2012 | Lee |
| 2004/0252091 A1 | 12/2004 | Ma et al. |
| 2006/0114237 A1 | 6/2006 | Crockett et al. |
| 2007/0075648 A1 | 4/2007 | Blythe et al. |
| 2009/0153519 A1 | 6/2009 | Suarez Rovere |
| 2011/0227874 A1 | 9/2011 | Fahraeus et al. |
| 2011/0291989 A1 | 12/2011 | Lee |
| 2012/0200538 A1 | 8/2012 | Christiansson et al. |
| 2013/0044073 A1 | 2/2013 | Christiansson et al. |
| 2013/0201142 A1 | 8/2013 | Suarez Rovere |

FOREIGN PATENT DOCUMENTS

| | | |
|---|---|---|
| WO | WO-2010/006883 A2 | 1/2010 |
| WO | WO-2010/006884 A2 | 1/2010 |
| WO | WO-2010/006885 A2 | 1/2010 |
| WO | WO-2010/006886 A2 | 1/2010 |
| WO | WO-2010/064983 A2 | 6/2010 |
| WO | WO-2010/134865 A1 | 11/2010 |
| WO | WO-2011/049512 A1 | 4/2011 |
| WO | WO-2011/139213 A1 | 11/2011 |
| WO | WO-2011/149149 A1 | 12/2011 |

OTHER PUBLICATIONS

International Search Report and Written Opinion dated Oct. 21, 2013 issued in corresponding International Application No. PCT/SE2013/050198.
Natterer, F. *The Mathematics of Computerized Tomography* (2001): Chapter 5.2 "Fourier Reconstruction", pp. 100-109.
Fourmont, K. "Non-Equispaced Fast Fourier Transforms with Applications to Tomography." *The Journal of Fourier Analysis and Applications*, v. 9, No. 5 (2003): pp. 431-450.

\* cited by examiner

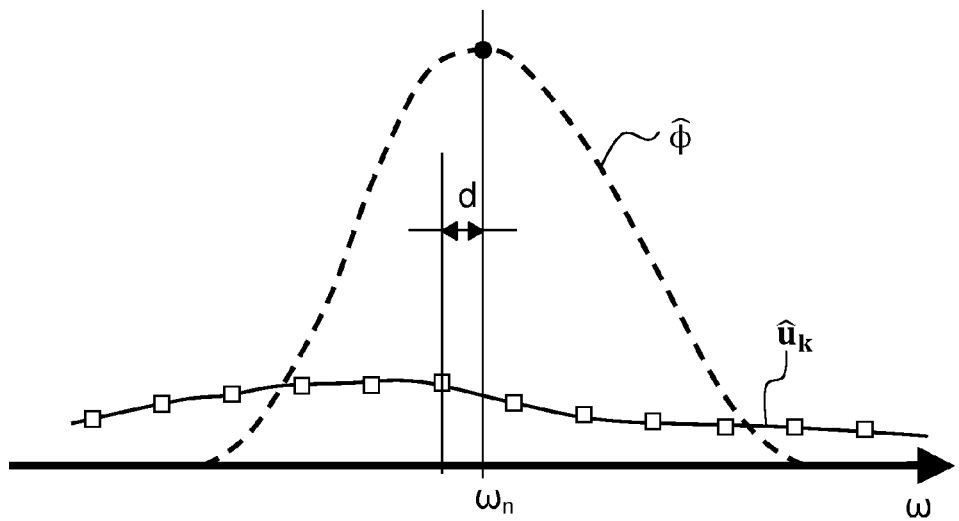
Fig. 7F
Fig. 7G
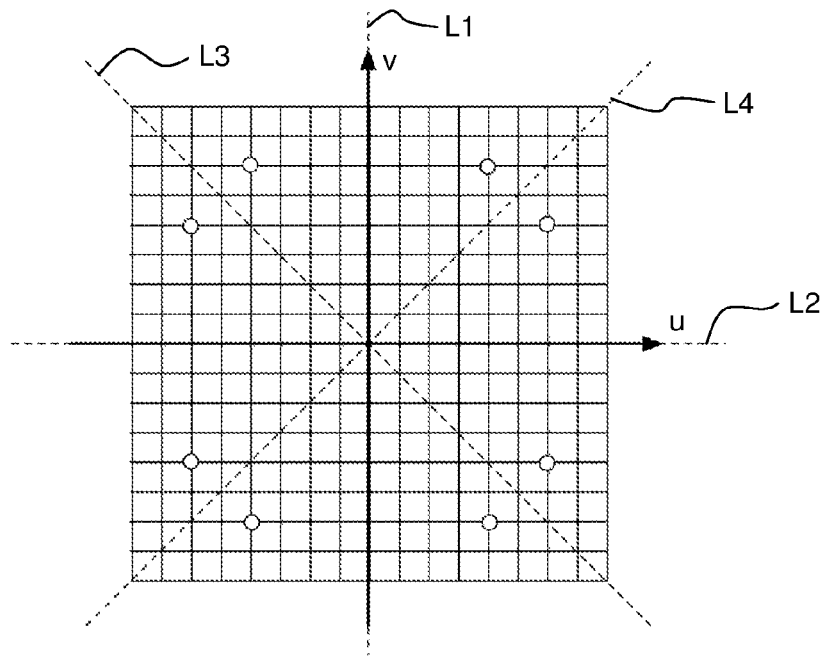
Fig. 8A

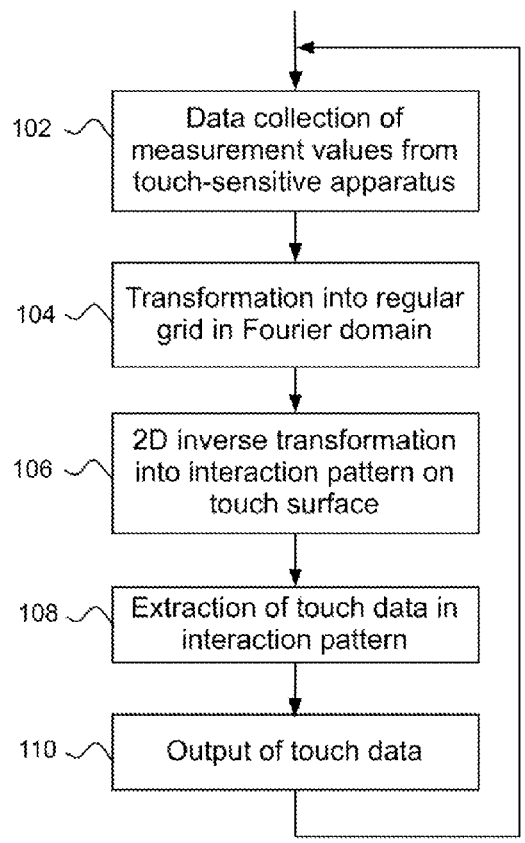
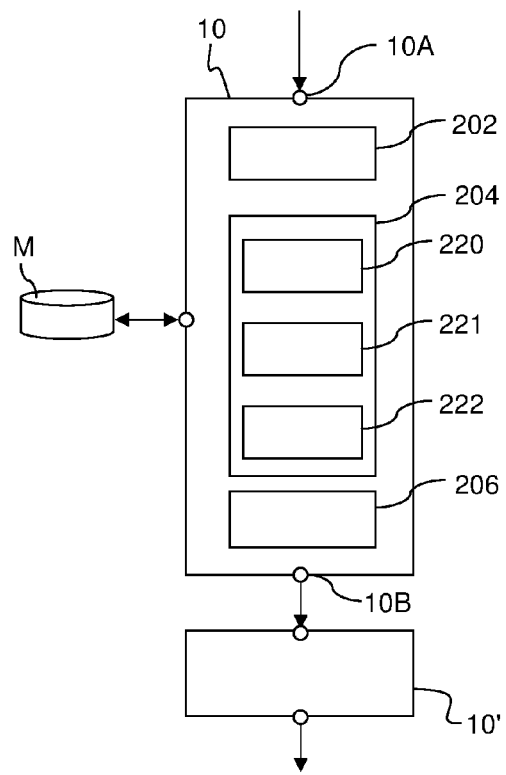
Fig. 12A
Fig. 12C

EFFICIENT TOMOGRAPHIC PROCESSING FOR TOUCH DETERMINATION

CROSS-REFERENCE TO RELATED APPLICATIONS

The present application is the National Phase of International Application No. PCT/SE2013/050198, filed 7 Mar. 2013, which claims priority to Swedish patent application No. 1250220-9, filed 9 Mar. 2012, and U.S. provisional application No. 61/608,745, filed 9 Mar. 2012, both of which are incorporated herein by reference.

TECHNICAL FIELD

The present invention relates to touch sensing systems and data processing techniques in relation to such systems.

BACKGROUND ART

Touch sensing systems ("touch systems") are in widespread use in a variety of applications. Typically, the touch systems are actuated by a touching object such as a finger or stylus, either in direct contact, or through proximity (i.e. without contact), with a touch surface. Touch systems are for example used as touch pads of laptop computers, in control panels, and as overlays to displays on e.g. hand held devices, such as mobile telephones. A touch system that is overlaid on or integrated in a display is also denoted a "touch screen". Many other applications are known in the art.

To an increasing extent, touch systems are designed to be able to detect two or more touches simultaneously, this capability often being referred to as "multi-touch" in the art. There are numerous known techniques for providing multi-touch sensitivity, e.g. by using cameras to capture light scattered off the point(s) of touch on a panel, or by incorporating resistive wire grids, capacitive sensors, strain gauges, etc into a panel.

US20040252091 discloses an alternative technique which is based on frustrated total internal reflection (FTIR). Light sheets are coupled into a panel to propagate inside the panel by total internal reflection. When an object comes into contact with a surface of the panel, two or more light sheets will be locally attenuated at the point of touch. Arrays of light sensors are located around the perimeter of the panel to detect the received light for each light sheet. A coarse reconstruction of the light field across the panel surface is then created by geometrically back-tracing and triangulating all attenuations observed in the received light. This is stated to result in data regarding the position and size of each contact area.

US20090153519 discloses a panel capable of conducting signals. A "tomograph" is positioned adjacent to the panel with signal flow ports arrayed around the border of the panel at discrete locations. Signals measured at the signal flow ports are arranged in a sinogram (b) and tomographically processed to generate a two-dimensional representation (x) of the conductivity on the panel, whereby touching objects on the panel surface can be detected. The presented technique for tomographic reconstruction is based on a linear model of the tomographic system, $Ax=b$. The system matrix A is calculated at factory, and its pseudo inverse $A^{-1}$ is calculated using Truncated SVD algorithms and operated on a sinogram b of measured signals to yield the two-dimensional (2D) representation of the conductivity: $x=A^{-1}b$. The suggested method is both demanding in the term of processing and lacks suppression of high frequency components, possibly leading to much noise in the 2D representation. US2009/0153519 also makes a general reference to Computer Tomography (CT). CT methods are well-known imaging methods which have been developed for medical purposes. CT methods employ digital geometry processing to reconstruct an image of the inside of an object based on a large series of projection measurements through the object.

One class of CT methods use Fourier transforms for image reconstruction, based on the so-called Projection-Slice Theorem, which stipulates that a 1D Fourier transform of projection values from a projection measurement results in a slice through a 2D Fourier transform of the image to be reconstructed. Thus, a method that operates a 1D Fourier transform on a sinogram of projection values will generate Fourier coefficients for data points arranged on radial lines in the Fourier domain, i.e. on a polar grid. The image may then be reconstructed by operating a 2D Fourier transform on the Fourier coefficients for the data points. To achieve appropriate computational speed and reconstruction accuracy, it may be desirable for the data points to be arranged on a Cartesian grid in the Fourier domain, e.g. to enable the use of inverse Fast Fourier Transforms (FFTs). Numerous techniques have been developed to transform the data points to a Cartesian grid, including interpolation techniques, e.g. as described in "The Mathematics of Computerized Tomography", by F Natterer, 2001, in Chapter V.2: "Fourier reconstruction".

A further example of an interpolation technique is described in the article "NonEquispaced Fast Fourier Transforms with Applications to Tomography" by K Fourmont, published in "Journal of Fourier Analysis and Applications", Volume 9, Number 5, pages 431-450 (2003). This article proposes a 1D FFT, denoted 1D NER, that operates on equispaced data (the projection values) to generate a non-equispaced result (the data points in the Fourier domain). Specifically, each 1D NER is adapted to generate the data points at such locations along the radial lines in the Fourier domain, so as to allow the Fourier coefficients on the Cartesian grid to be generated by angular interpolation.

With respect to signal processing in touch systems, WO 2011/139213 discloses an improved technique for tomographic reconstruction based on signals from a touch system that operates by transmission of light inside a light transmissive panel. The signals, which represent detected energy on a plurality of detection lines across the touch surface, are processed to generate a set of matched samples, which are indicative of estimated detected energy for fictitious detection lines that have a location on the touch surface that matches a standard geometry for tomographic reconstruction. This technique enables the touch system to be designed with any arrangement of detection lines across the touch surface, while still allowing for the use of conventional tomographic reconstruction algorithms. These algorithms will generate an interaction pattern that represents the location of objects on the touch surface. With respect to existing Fourier-based reconstruction techniques, e.g. as exemplified above, the set of matched samples may form the sinogram (the projection values) that is processed by 1D Fourier transformation.

One challenge in respect of touch systems is that the interaction pattern may need to be generated in real time. This task is made even more demanding if the touch system is restricted in terms of processing speed or storage capacity, e.g. due to constraints imposed by a desire to reduce costs, limit power consumption, provide a certain form factor, etc.

SUMMARY

It is an objective of the invention to at least partly overcome one or more limitations of the prior art.

Another objective is to provide a Fourier-based technique for image reconstruction in touch systems that enables improved processing speed and/or reduced need for storage capacity.

One or more of these objectives, as well as further objectives that may appear from the description below, are at least partly achieved by means of a method of enabling touch determination, a computer program product, a device for enabling touch determination, and a touch-sensitive apparatus according to the independent claims, embodiments thereof being defined by the dependent claims.

A first aspect of the invention is a method of enabling touch determination based on an output signal from a touch-sensitive apparatus. The apparatus comprises a touch surface and being configured to propagate signals across the touch surface. The method comprises: processing the output signal to generate data samples indicative of transmitted signal energy on parallel detection lines at a number of different angles across the touch surface; processing the data samples to generate interpolated Fourier coefficients at grid points in a regular grid in a Fourier domain; and operating a two-dimensional inverse Fourier transform on the interpolated Fourier coefficients so as to generate an interaction pattern indicative of touch interaction on the touch surface. The step of processing the data samples comprises: sequentially generating the interpolated Fourier coefficients for individual groups of grid points, wherein each individual group comprises grid points that have equal distance to an origin in the regular grid.

According to the first aspect, the interpolated Fourier coefficients are generated for sequential groups of grid points. The grid points in each group have equal distance to the origin of the regular grid in the Fourier domain, which is equivalent to an equal radial frequency. By jointly evaluating grid points of equal radial frequency, it is possible to re-use intermediate computation data, which is generated for computing the interpolated Fourier coefficient of one grid point, when computing the interpolated Fourier coefficient of another grid point in the same group. The intermediate computation data may include pre-computed parameter values that are acquired from electronic memory as well as intermediate computation results. For example, it is possible to re-use weight factors (pre-computed or computed on demand) that are applied in a radial interpolation among Fourier coefficients at data points on radial lines in the Fourier domain, and/or to re-use interpolation coefficients (pre-computed or computed on demand) that are applied in an angular interpolation among Fourier coefficients on different radial lines in the Fourier domain, and/or to apply a common radial filter value when generating the interpolated Fourier coefficients for the group of grid points.

It is thus realized that the group-wise processing according to first aspect generally makes it possible to reduce the need for storage capacity, e.g. by clever generation and storage of the computation data (parameter values and/or intermediate computation results), and/or improve the processing speed, e.g. by reducing the number of memory accesses during processing or the number of processing operations for generating the computation data (parameter values and/or intermediate computation results).

It should be understood that "sequentially generating" implies that individual groups are evaluated in sequence, for generation of interpolated Fourier coefficients, whereas the grid points within each group may be evaluated either in sequence or in parallel. It should also be noted that "sequentially generating" does not exclude that more than one group is evaluated in parallel, as long as there are groups that are evaluated in sequence. As used herein, a "group of grid points" contains at least two grid points.

The first aspect enables various specific improvements in terms of memory usage or processing speed, e.g. as implemented by the following embodiments.

In one embodiment, the grid points in each individual group are mapped onto each other by one or more lines of symmetry in the regular grid.

In one embodiment, the data samples are generated so as correspond to Fourier coefficients at data points on a plurality of radial lines that extend through the origin in the regular grid, wherein the step of processing the data samples comprises: processing the data samples to generate the Fourier coefficients at the data points on the plurality of radial lines, and processing the Fourier coefficients of the data points on the plurality of radial lines by interpolation to generate the interpolated Fourier coefficients.

In one embodiment, pairs of neighboring radial lines define sectors in the regular grid, and the step of processing the data samples comprises processing the sectors in a predetermined order, wherein a current sector is processed by identifying current grid points within the current sector, and sequentially generating, based on the current grid points, the interpolated Fourier coefficients for the individual groups of grid points.

In one embodiment, the sectors in the predetermined order are arranged such that there is a common radial line between consecutive sectors.

In one embodiment, the step of processing the sectors results in stepwise generation of the interpolated Fourier coefficients along a plurality of grid lines that extend in a first dimension of the regular grid, wherein each grid line comprises a most recently generated Fourier coefficient that defines a forthcoming grid point, and the step of identifying the current grid points comprises: tracking the forthcoming grid points for the plurality of grid lines; determining a direction vector of the common radial line between the current sector and a forthcoming sector in the predetermined order; determining direction vectors of radial grid point lines from the origin in the regular grid to each of the forthcoming grid points; and identifying the current grid points among the forthcoming grid points by comparing the direction vector of the common radial line to the direction vectors of the radial grid point lines.

In one embodiment, the step of comparing the direction vector of the common radial line to the direction vectors of the radial grid point lines comprises: calculating a product between the direction vector of the common radial line and each of the direction vectors of the radial grid point lines, wherein the current grid points are identified based on the resulting products.

In one embodiment, at least one of said direction vector of the common radial line and said each of the direction vectors of the radial grid point lines is a normal vector, and said product is one of a dot product and a vector product.

In one embodiment, the interpolated Fourier coefficient of each grid point in the group of grid points is generated by: obtaining the Fourier coefficients for the data points on a pair of neighboring radial lines; performing a first interpolation to generate temporary Fourier coefficients on the pair of neighboring radial lines at positions with said equal distance to the origin; and performing a second interpolation between the temporary Fourier coefficients on the pair of neighboring radial lines to generate the interpolated Fourier coefficient of the grid point.

In one embodiment, the temporary Fourier coefficients on each radial line in the pair of neighboring radial lines is generated by aggregating the Fourier coefficients for the data points on the radial line while applying a set of weight factors so as to generate the temporary Fourier coefficient, wherein the same set of weight factors is applied for generating the temporary Fourier coefficients in respect of each grid point in the group of grid points.

In one embodiment, the step of processing the output signal generates the data samples such that at least some of the radial lines are mapped onto each other by said one or more lines of symmetry in the regular grid.

In one embodiment, said at least some of the radial lines that are mapped onto each other comprises pairs of neighboring radial lines.

In one embodiment, the step of performing the second interpolation comprises: applying a set of interpolation coefficients to the temporary Fourier coefficients on the pair of neighboring radial lines so as to generate the interpolated Fourier coefficient of the grid point, wherein the same set of interpolation coefficients is applied when generating the interpolated Fourier coefficient of each grid point in the group of grid points.

In one embodiment, the step of performing the second interpolation comprises: determining direction vectors of the pair of neighboring radial lines; and generating the interpolated Fourier coefficient of the grid point as a function of the temporary Fourier coefficients and products between each of the direction vectors of the pair of neighboring radial lines and a direction vector of a radial grid point line that extends from the origin in the regular grid to the grid point.

In one embodiment, the method further comprises a step of applying a group-specific filter value when generating the interpolated Fourier coefficients for the grid points in each individual group, the group-specific filter value being associated with a given radial frequency of a radial filter function.

In one embodiment, the grid points are located in a half-plane of the Fourier domain.

In one embodiment, the set of data samples is generated as a function of light that has propagated along light paths inside a light transmissive panel by internal reflections between a front surface and a rear surface, wherein the front surface defines the touch surface and allows the propagating light to be attenuated by interaction with touching objects.

In one embodiment, the step of processing the output signal comprises: acquiring measurement values for a set of actual detection lines that extend across the touch surface, and processing the measurement values to generate the data samples for fictitious detection lines that match said parallel detection lines.

A second aspect of the invention is a computer program product comprising computer code which, when executed on a data-processing system, is adapted to carry out the method of the first aspect.

A third aspect of the invention is a device for enabling touch determination based on an output signal of a touch-sensitive apparatus. The apparatus comprises a touch surface and being configured to propagate signals across the touch surface. The device comprises: means for processing the output signal to generate data samples indicative of transmitted signal energy on parallel detection lines at a number of different angles across the touch surface; means for processing the data samples to generate interpolated Fourier coefficients at grid points in a regular grid in a Fourier domain; and means for operating a two-dimensional inverse Fourier transform on the interpolated Fourier coefficients so as to generate an interaction pattern indicative of touch interaction on the touch surface. The means for processing the data samples comprises means for sequentially generating the interpolated Fourier coefficients for individual groups of grid points, wherein each individual group comprises grid points that have equal distance to an origin in the regular grid.

A fourth aspect of the invention is a touch-sensitive apparatus, comprising: a panel configured to conduct signals from a plurality of peripheral incoupling points to a plurality of peripheral outcoupling points and defining a touch surface; means for generating the signals at the incoupling points; means for generating an output signal based on detected signals at the outcoupling points; and the device of the third aspect.

Any one of the above-identified embodiments of the first aspect may be adapted and implemented as an embodiment of the second to fourth aspects to attain the corresponding technical effects and advantages.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 7F is an enlarged view of FIG. 7E, and FIG. 7G shows a data structure for storing weight factors for the radial interpolation.

FIGS. 8A-8B are plots of a Cartesian grid in the Fourier domain and illustrate symmetric grid points and symmetric radial lines, respectively.

FIG. 12A-12B are flow charts of a touch determination method, and FIG. 12C is a block diagram of hardware that implements the method of FIGS. 12A-12B.

DETAILED DESCRIPTION OF EXAMPLE EMBODIMENTS

Figure 1A:
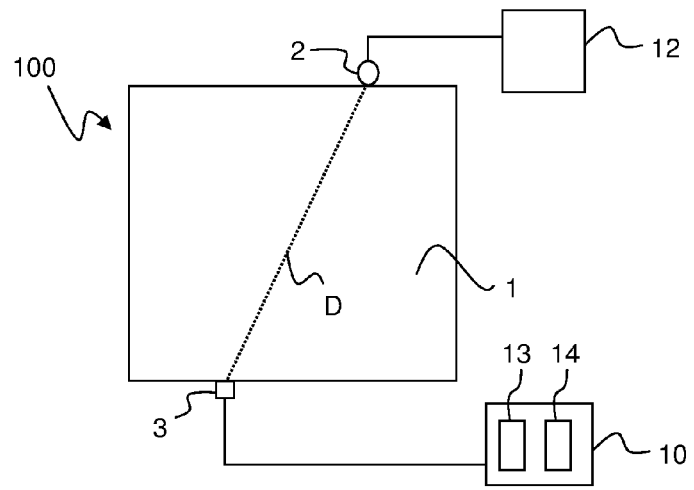
FIG. 1A is a top plan view of a touch-sensitive apparatus.

The following example embodiments are directed to techniques that may improve processing speed and/or reduce the need for data storage in connection with Fourier-based image reconstruction in a touch-sensitive apparatus. Throughout the description, the same reference numerals are used to identify corresponding elements.

1. Touch-Sensitive Apparatus

FIG. 1A illustrates a touch-sensitive apparatus 100 which is based on the concept of transmitting energy of some form across a touch surface 1, such that an object that is brought into close vicinity of, or in contact with, the touch surface 1 causes a local decrease in the transmitted energy. The touch-sensitive apparatus 100 includes an arrangement of emitters and sensors, which are distributed along the periphery of the touch surface. Each pair of an emitter and a sensor defines a detection line, which corresponds to the propagation path for an emitted signal from the emitter to the sensor. In FIG. 1A, only one such detection line D is illustrated to extend from emitter 2 to sensor 3, although it should be understood that the arrangement typically defines a more or less dense grid of intersecting detection lines, each corresponding to a signal being emitted by an emitter and detected by a sensor. Any object that touches the touch surface along the extent of the detection line D will thus decrease its energy, as measured by the sensor 3.

The arrangement of sensors (detectors) is electrically connected to a signal processor 10, which samples and processes an output signal from the arrangement. The output signal is indicative of the received energy (or an equivalent parameter, such as power or intensity) at each sensor 3. As will be explained below, the signal processor 10 may be configured to process the output signal by a tomographic technique to recreate a two-dimensional representation of the distribution of an interaction-related parameter (for simplicity, referred to as "interaction pattern" in the following) across the touch surface 1. The interaction pattern, which represents the local interaction with the signals that propagate across the touch surface, may be further processed by the signal processor 10 or by a separate device (not shown) for touch determination, which may involve extraction of touch data, such as a position (e.g. x, y coordinates), a shape or an area of each touching object.

In the example of FIG. 1A, the apparatus 100 also includes a controller 12 which is connected to selectively control the activation of the emitters 2 and, possibly, the readout of data from the sensors 3. The signal processor 10 and the controller 12 may be configured as separate units, or they may be incorporated in a single unit. As indicated, the signal processor 10 may include a processing unit 13 that operates in association with an electronic memory 14.

From the point of view of tomographic reconstruction, the touch surface 1 has ideally a circular shape. However, in practical applications, the touch surface is typically non-circular, e.g. rectangular as shown. For example, the shape of the touch surface 1 may be given by consideration of cost, ease of manufacture and installation, design, form factor, etc. Furthermore, if the touch surface 1 is overlaid on or integrated in a rectangular display device, the touch surface 1 is likely to also be designed with a rectangular shape. However, the embodiments of the invention are applicable irrespective of the shape of the touch surface 1.

The apparatus 100 may be configured to permit transmission of energy in one of many different forms. The emitted signals may thus be any radiation or wave energy that can travel in and across the touch surface 1 including, without limitation, light waves in the visible or infrared or ultraviolet spectral regions, electrical energy, electromagnetic or magnetic energy, or sonic and ultrasonic energy or vibration energy.

Figure 1B:
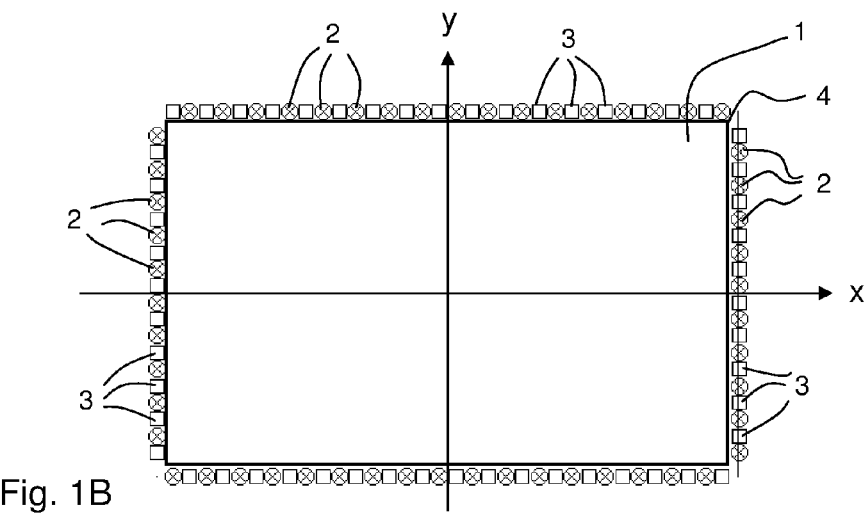
FIG. 1B is a top plan view of an FTIR-based touch-sensitive apparatus with an interleaved arrangement of emitters and sensors.

Embodiments of the invention may, e.g., be applied in an apparatus 100 that operates by frustrated total internal reflection (FTIR), as described in the Background section. FIG. 1B illustrates an example of such an "FTIR system", which has an "interleaved arrangement" of emitters 2 and sensors 3, i.e. the emitters 2 and sensors 3 are placed one after the other along the periphery of a light transmissive panel 4, which defines the surface 1. Light generated by the emitters 2 is coupled into the panel 4 at a plurality of incoupling points (ports), propagates by TIR inside the panel 4, and is detected by the sensors 3 at plurality of outcoupling points (ports). The light is coupled into the panel 4 in the shape of a beam or wave that diverges in the plane of the touch surface 1, and the sensors 3 are arranged to receive light over a wide range of angles (field of view). Thereby, each emitter 2 transmits light to a plurality of sensors 3, and each sensor 3 receives light from a plurality of emitters 2.

It is to be understood that FIG. 1B merely illustrates one example of an FTIR system. Further examples of FTIR systems are e.g. disclosed in U.S. Pat. No. 6,972,753, U.S. Pat. No. 7,432,893, US2006/0114237, US2007/0075648, WO2009/048365, WO2010/006882, WO2010/006883, WO2010/006884, WO2010/006885, WO2010/006886, WO2010/064983, and WO2010/134865, which are all incorporated herein by this reference. The inventive concept may be advantageously applied to such alternative FTIR systems as well.

2. Fourier-Based Reconstruction in Touch-Sensitive Apparatus

Fourier-based reconstruction techniques make use of the mathematical theorem called Projection-Slice Theorem. This Theorem states that given a two-dimensional function $f(x, y)$, the one- and two-dimensional Fourier transforms $\mathcal{F}_1$ and $\mathcal{F}_2$, a projection operator $\mathcal{R}$ that projects a two-dimensional (2D) function onto a one-dimensional (1D) line, and a slice operator $S_1$ that extracts a central slice of a function, the following calculations are equal:

$$\mathcal{F}_1 \mathcal{R} f(x,y) = S_1 \mathcal{F}_2 f(x,y)$$

Figure 2:
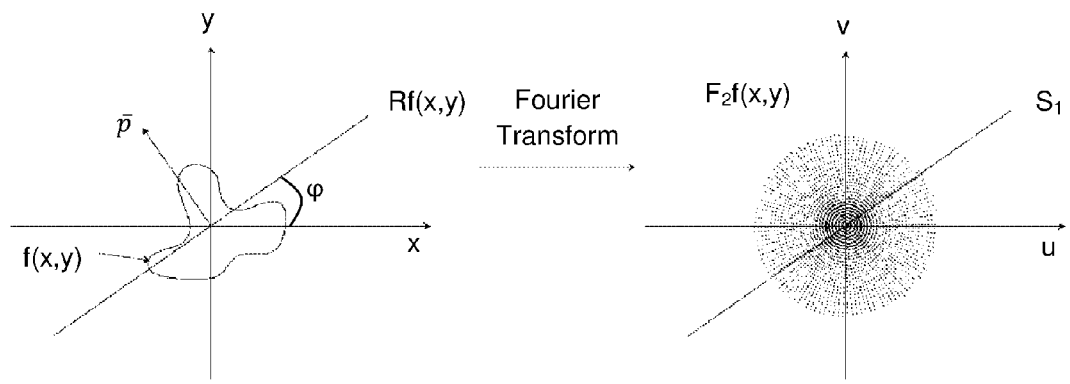
FIG. 2 illustrates the underlying principle of the Projection-Slice Theorem.

This relation is illustrated in FIG. 2. The right-hand side of the equation above essentially extracts a 1D line (a slice) of the 2D Fourier transform of the function $f(x, y)$. The line passes through the origin of the Fourier domain, as shown in the right-hand part of FIG. 2. The left-hand side of the equation starts by projecting (i.e. integrating along 1D lines in the projection direction $\bar{p}$) the 2D function onto a 1D line (orthogonal to the projection direction $\bar{p}$), which forms a "projection" that is made up of the projection values for all the different detection lines extending in the projection direction p. Thus, taking a 1D Fourier transform of the projection gives the same result as taking a slice from the 2D Fourier transform of the function $f(x, y)$. In the context of the following disclosure, the function $f(x, y)$ corresponds to the interaction pattern $\alpha(x, y)$, which is to be reconstructed.

Figure 3:
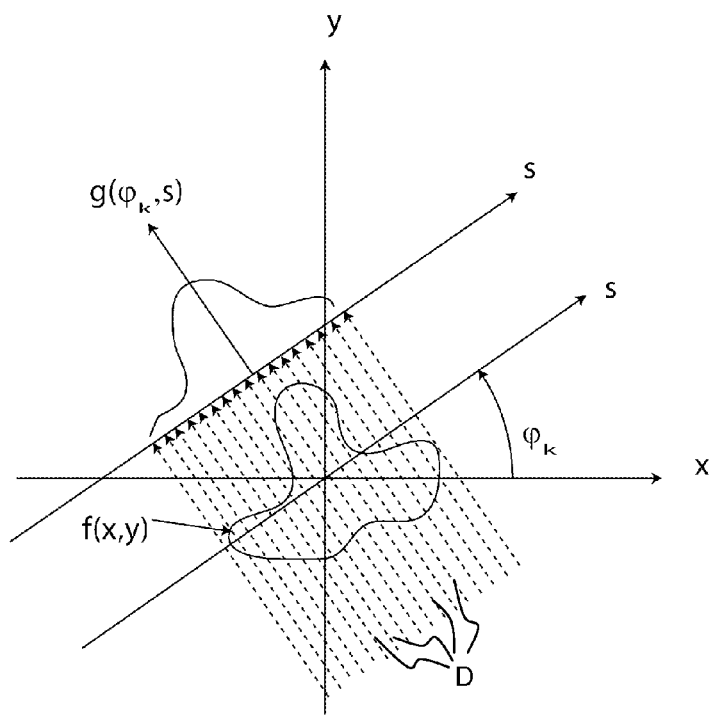
FIG. 3 illustrates a measurement system used for conventional tomographic analysis.

In tomographic processing, the reconstruction algorithms presume a specific geometric arrangement of the detection lines. In conventional tomography, e.g. as used in the field of medical imaging, the measurement system (i.e. the location of the incoupling points and/or outcoupling points) is controlled or set to yield the desired geometric arrangement of detection lines. Such a measurement system is exemplified in FIG. 3. Here, the system measures projection values of a set of detection lines for a given angle $\phi_k$. In FIG. 3, the set of detection lines D are indicated by dashed arrows, and the resulting projection is represented by the function $g(\phi_k, s)$. The measurement system is then rotated slightly around the origin of the x, y coordinate system in FIG. 3, to collect projection values for a new set of detection lines at this new rotation angle. As shown by the dashed arrows, all detection lines are parallel to each other for each rotation angle φ.

The set of projection values collected for different angles and distances may be stacked together to form a "sinogram". The sinogram is generally given in a 2D sample space defined by dimensions that uniquely assign each projection value to a specific detection line. For example, the sample space may be defined by the above-mentioned angle and distance parameters φ, s. In one specific implementation, the sinogram is given by $g(\phi_k, s_l)$, where $0 \leq k < p$ and $-q \leq l \leq q$. The angle parameter may be given by $\phi_k = k \cdot \pi/p$ and the distance parameter by $s_l = l \cdot \pi/q$, which means that the projection values are sampled with equal spacing in the angle and distance dimensions φ, s.

Figure 4A:
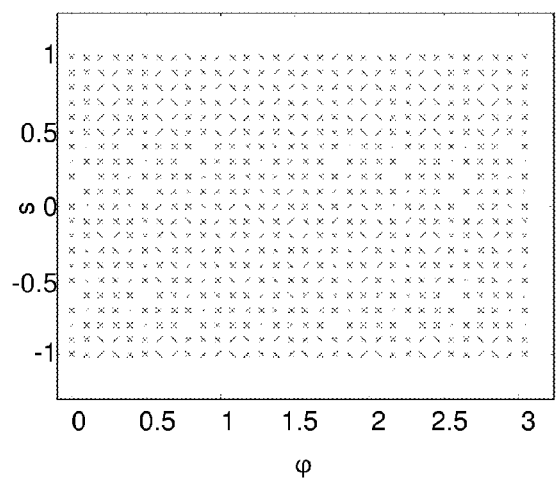
FIG. 4A is a sinogram obtained by the measurement system in FIG. 3 with uniform sampling.

To further exemplify the tomographic processing, a sinogram is shown in FIG. 4A. The sinogram represents the function g(φ, s), and every cross in FIG. 4A corresponds to a detection line and is associated with a measured projection value. It is understood that in this particular example, the projection values are sampled with equal spacing in the angle and distance parameters φ, s.

According to the Projection-Slice Theorem, the 1D Fourier transform of each column in the sinogram of FIG. 4A results in a slice of data points in the Fourier domain. Theoretically, the 2D Fourier transform of $f(x, y)$ is given by:

$$F(u, v) = \int_{-\infty}^{\infty} \int_{-\infty}^{\infty} f(x, y) \cdot e^{-2\pi \cdot i \cdot (x \cdot u + y \cdot v)} dx\, dy$$

where u and v are dimension parameters that represent frequency in the x direction and y direction, respectively. Since $f(x, y)$ is represented by discrete data samples, F(u, v) is rather given by a corresponding discrete 2D Fourier transform, as is well-known to the person skilled in the art.

Figure 4B:
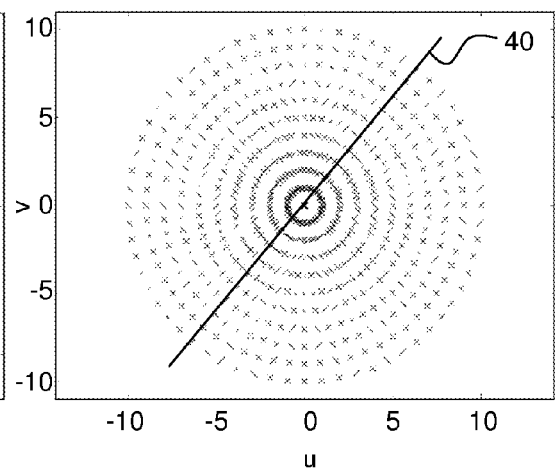
FIG. 4B is a 2D representation in the Fourier domain of the sampling points in FIG. 4A.

Each data point in such a slice of data points has a location given by specific frequency values of the dimension parameters u, v and is associated with a complex value corresponding to the Fourier coefficient of this specific location. All of the slices extend through the origin of the Fourier domain and the number of data points (outside the origin) on each slice may be equal to the number of sampling points (projection values) in the respective column of the sinogram. The number of data points may differ from the number of sampling points by the use of oversampling and zero-padding, as known to the person skilled in the art. FIG. 4B is a plot of the data points generated by discrete 1D Fourier transforms of the columns in FIG. 4A, with one slice being indicated by solid line 40. According to the Projection-Slice Theorem, the frequency data in FIG. 4B represents the 2D Fourier transform F(u, v) of the function $f(x, y)$. As seen in FIG. 4B, the frequency data F(u, v) obtained from the data samples in the sinogram of FIG. 4A matches a polar grid in the Fourier domain (Fourier space), i.e. the data points in F(u, v) are arranged in concentric circles around the origin, and each circle contains the same number of equiangularly spaced data points.

It is realized that the function $f(x, y)$ may be reconstructed by applying a Fourier inversion process to the frequency data F(u, v), e.g. an inverse 2D FFT. However, since the interaction pattern is defined in a regular grid (x, y coordinate system), the polar distribution of discrete data points in F(u, v) needs to be converted into a regular grid in the Fourier domain. As used herein a "regular grid" denotes a two-dimensional grid which is defined by mutually orthogonal grid lines with equal spacing in the respective dimension and in which the vertices (grid points) are addressed by two dimension parameter values. The grid lines thus define rectangular grid cells. A special case of a regular grid is a Cartesian grid, in which the grid cells are unit squares, and the vertices are defined by integer values. The conversion into a regular grid may be achieved in a number of different ways, e.g. as described in the above-referenced publications by Natterer and Fourmont. Further techniques for generating the frequency data F(u, v) in a regular grid are found in "Mathematical Methods in Image Reconstruction", by F Natterer and F Wiibbeling, 2001, in Chapter 5.2: "Fourier reconstruction". All of these publications are incorporated herein by reference. Section 3, below, describes various processing optimizations for generating the frequency data on a regular grid.

Figure 5:
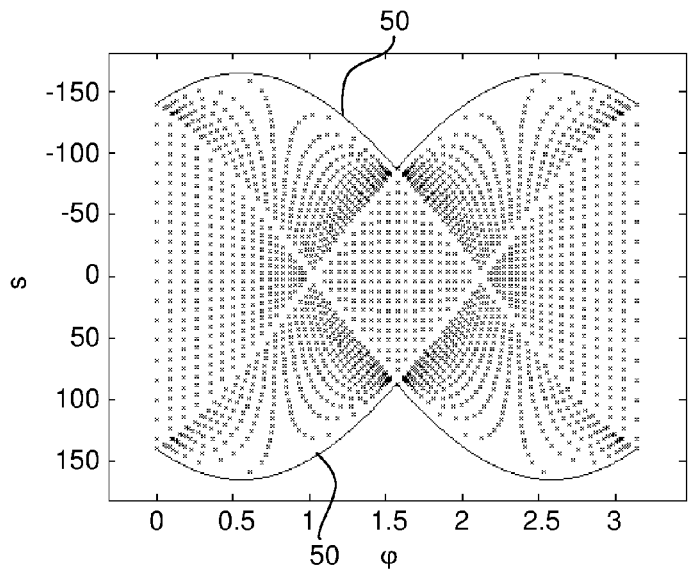
FIG. 5 is a sinogram defined by the interleaved arrangement in FIG. 1B.

Reverting now to the touch-sensitive apparatus 100, as exemplified by the interleaved arrangement in FIG. 1B, it is realized that the detection lines do not fully correspond to the projection measurements of the conventional measurement system in FIG. 3. FIG. 5 is a sinogram for the interleaved system in FIG. 1B. As seen, the sampling points (corresponding to detection lines, and thus to measured projection values) are irregularly arranged in the sample space (φ, s coordinate system). Also, the sampling points are only available in part of the sample space. The solid lines 50 indicate the physical limits of the touch surface, and outside of these lines there are no sampling points.

The irregular sampling points make it difficult to generate a 2D Fourier transform of the sinogram. This may be overcome by processing the projection values of the sampling points in FIG. 5 according to the matching techniques described in aforesaid WO 2011/139213 to generate projection values for a set of matched samples in a regular arrangement in the sample space, e.g. as shown in FIG. 4A. The matched samples are thereby generated as projection values for fictitious detection lines with a desired extent across the touch surface. There are typically no projection values outside the solid lines 50 in FIG. 5, although it is possible to design the matching technique so as to provide matched samples also outside the lines 50, e.g. by extrapolation as described in WO2011/139213.

Figure 6:
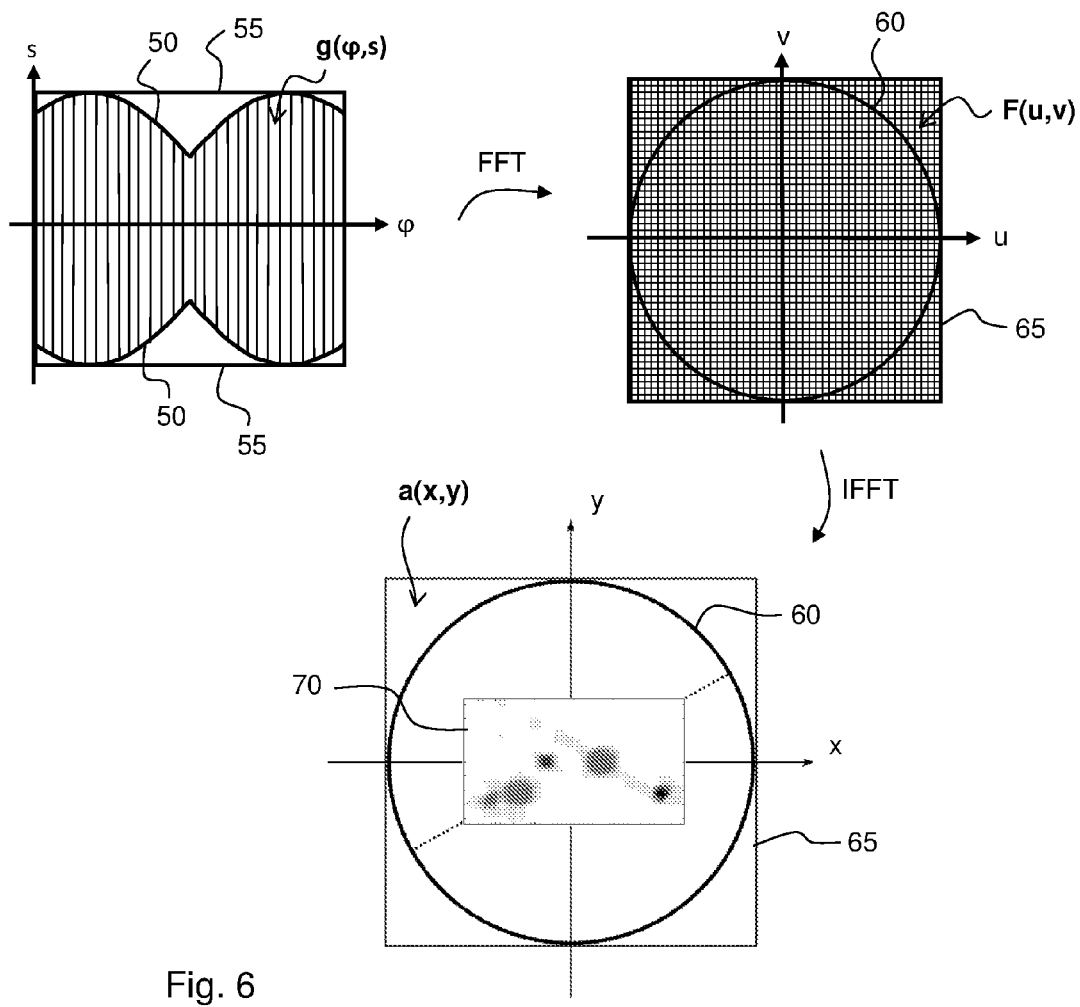
FIG. 6 illustrates a process for Fourier-based reconstruction of an interaction pattern from a sinogram of projection values.

FIG. 6 gives an overview of the reconstruction process described in the foregoing. The illustrated process starts from a sinogram g(φ, s), in which the projection values form columns (indicated by vertical lines) with respect to the s variable. The projection values in the sinogram are processed by Fourier transformation (indicated by FFT in FIG. 6), and possibly additional measures, so as to generate the frequency data F(u, v) consisting of Fourier coefficients (each with an imaginary part and a real part) at data points arranged in a regular grid (indicated by patterned area). The circle 60 indicates the subset of the frequency data F(u, v) that corresponds to a complete set of sampling points, i.e. a complete sinogram bounded by lines 55. The person skilled in the art realizes that the circle 60 circumscribes the actual touch surface and defines the theoretical extent of the touch surface if designed in accordance with the underlying theory of the Projection-Slice Theorem (which presumes that the measurement system is rotated a full revolution along a circular path). The square 65 indicates the required minimum limits of the frequency data F (u, v) when generating the interaction pattern a(x, y) by inverse Fourier transformation. This means that the Fourier coefficients of the data points outside the circle 60 are set to a zero, so as to allow the inverse Fourier transformation to operate on the same number of data points in the columns and rows, respectively, in the regular grid. The frequency data F(u, v) is then processed by inverse Fourier transformation (indicated by IFFT in FIG. 6), so as to generate the interaction pattern a(x, y). Inverse Fourier transformation is well-known to the skilled person. As indicated, the outer limits of the resulting pattern a(x, y) corresponds to the outer limits of the frequency data F(u, v), designated by the square 65, which circumscribes the circle 60, i.e. the theoretical extent of the touch surface. The region that corresponds to the actual touch surface 1 in the interaction pattern is indicated by 70. It is be understood that the reconstruction process may be tailored to only reconstruct the interaction pattern a(x, y) within the region of interest 70, thereby reducing the number of processing operations in the reconstruction processing. The spacing between the region 70 and the circle 60, indicated by dotted lines, is given by the degree of oversampling introduced when generating the frequency data F(u, v), e.g. to achieve a desired spatial resolution of the interaction pattern a(x, y), as is well-known in the art.

3. Optimizations of Fourier-Based Reconstruction

This section presents various optimizations that may be made with respect to the generation of frequency data on a regular grid (cf. F(u, v) in FIG. 6). The following examples presume that the regular grid is a Cartesian grid, although the optimizations may also be applied to other types of regular grids. The following examples also presume that the sampling points are equispaced in both the $\phi$ dimension and the s dimension, e.g. as shown in the sinogram of FIG. 4A. However, the skilled person realizes that corresponding optimizations are applicable as long as the sampling points are aligned with respect to discrete values of the angle parameter $\phi$ to form columns in the sample space. For example, the spacing ($\Delta\phi$) of columns may differ between different columns, and the spacing ($\Delta$s) between sampling points may be different in different columns.

Figure 7A:
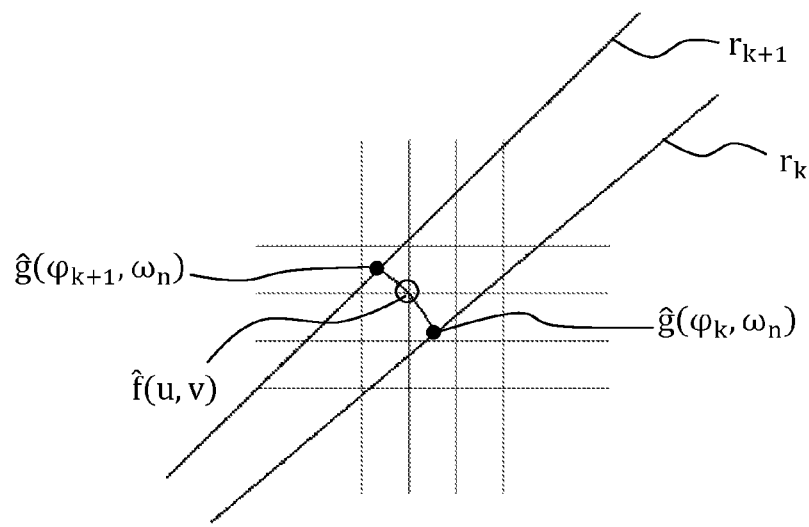
FIG. 7A is a plot to illustrate radial and angular interpolation.

Before describing the optimizations in detail, a simplified and generalized step-by-step algorithm for computing the Fourier coefficient at a specific grid point in the Cartesian grid will be described with reference FIG. 7A. The algorithm operates a one-dimensional Fourier transform (e.g. a 1D FFT) on the projection values in a respective column of the sinogram (cf. FIG. 6) to generate slices of equidistant data points in the Fourier domain. FIG. 7A illustrates two slices (or "radial lines") $r_k$ and $r_{k+1}$ generated for projection values associated with angles $\phi_k$ and $\phi_{k+1}$, respectively. The two slices are closest neighbors in the Fourier domain and thereby form a pair of "neighboring radial lines" in the Fourier domain. The task is to calculate the Fourier coefficient $\hat{f}(u, v)$ of the grid point, which has a distance $\omega_n$ to the origin of the Cartesian grid given by $\omega_n=|(u, v)|$. The calculation of $\hat{f}(u, v)$ involves two interpolation steps. In a first (radial) interpolation step, the Fourier coefficients of the equidistant data points on the respective slice $r_k$, $r_{k+1}$ are processed to generate a Fourier coefficient at an interpolated data point, which is located on the slice at the distance $\omega_n$ ("radial frequency") to the origin of the Cartesian grid. The interpolated data points may be denoted "frequency-matched data points", since they are matched to the radial frequency of $\hat{f}(u, v)$. The Fourier coefficient $\hat{g}(\phi_k, \omega_n)$, $\hat{g}(\phi_{k+1}, \omega_n)$ at the respective frequency-matched data point on the neighboring radial lines may be regarded as a "temporary Fourier coefficient" since it is an intermediate computation result which is used (in the second interpolation step, below) for computing the Fourier coefficient $\hat{f}(u, v)$ of the grid point. On the drawings, the frequency-matched data points are indicated by black dots. In a second (angular) interpolation step, the temporary Fourier coefficients $\hat{g}(\phi_k, \omega_n)$, $\hat{g}(\phi_{k+1}, \omega_n)$ of the frequency-matched data points are processed to generate the Fourier coefficient $\hat{f}(u, v)$ at the grid point by angular interpolation in the Fourier domain. The Fourier coefficient $\hat{f}(u, v)$ at the grid point may thus be denoted an "interpolated Fourier coefficient". The angular interpolation step may involve any suitable interpolation between $\hat{g}(\phi_k, \omega_n)$ and $\hat{g}(\phi_{k+1}, \omega_n)$. In one example, the angular interpolation is a linear interpolation: $\hat{f}(u, v)=a\cdot\hat{g}(\phi_k, \omega_n)+b\cdot\hat{g}(\phi_{k+1}, \omega_n)$, where a and b are interpolation coefficients. In another example, the angular interpolation is a nearest-neighbor interpolation, in which $\hat{f}(u, v)$ is set equal to either $\hat{g}(\phi_k, \omega_n)$ or $\hat{g}(\phi_{k+1}, \omega_n)$ depending on the angular distance between the grid point and the respective frequency-matched data point. The nearest-neighbor interpolation may be regarded as a linear interpolation in which one of the interpolation coefficients a, b is set to zero and the other is set to one. More advanced implementations of the angular interpolation are conceivable, e.g. using non-linear interpolation functions.

Figure 7B:
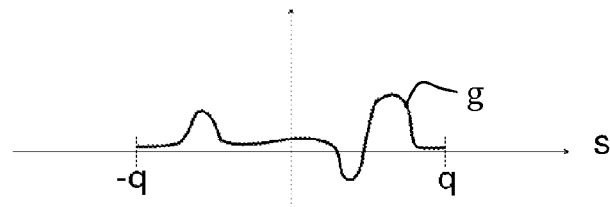
FIGS. 7B-7C are plots of projection values without and with oversampling and zero-padding.
Figure 7C:
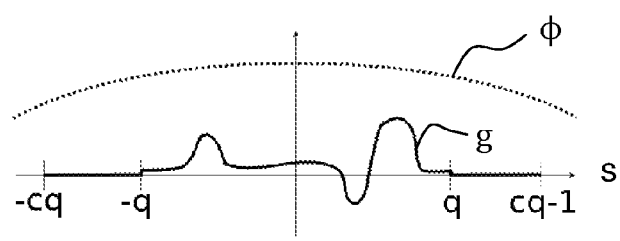

The above algorithm is further exemplified in FIGS. 7B-7F. FIG. 7B shows projection values g obtained for a given angle $\phi_k$. As indicated in FIG. 7C, an oversampling factor c may be applied to the projection values, zero-padding may be used, and a compensation function $\phi$ may be applied to the resulting projection values, as is well-known to the skilled person. All of this is optional, but may improve the reconstructed pattern. The result is an input vector $u_k$ given by:

$$u_k = \begin{cases} 0, & l = -c\cdot q, \ldots, -q-1 \\ g(\varphi_k, s_l)/\phi(l/(c\cdot q)), & l = -q, \ldots, q-1 \\ 0, & l = q, \ldots, c\cdot q-1 \end{cases}.$$

Figure 7D:
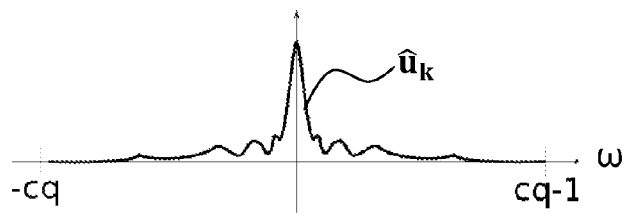
FIG. 7D is a plot of a radial vector generated by Fourier transformation of the data in FIG. 7C.

Then, a Fourier transform of the input vector $u_k$ is computed, e.g. by 1D FFT. This results in a radial vector $\hat{u}_k$ containing Fourier coefficients $\hat{u}_{k,i}$ for data points on a slice in the Fourier domain (cf. $r_k$ in FIG. 7A). FIG. 7D illustrates the magnitude of the Fourier coefficients $\hat{u}_{k,i}$ as a function of the radial frequency $\omega$.

Figure 7E:
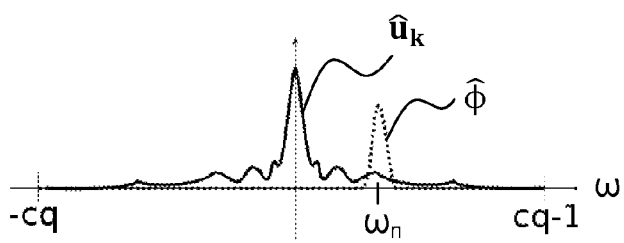
FIG. 7E is plot of an interpolation function overlaid on the radial vector.

In the radial interpolation step, exemplified in FIG. 7E, a radial interpolation function $\hat{\phi}(\omega)$ is applied to generate the Fourier coefficient at the selected radial frequency $\omega_n$ (i.e. a frequency-matched data point) by a weighted aggregation of the Fourier coefficients $\hat{u}_{k,i}$:

$$\hat{g}(\phi_k,\omega_n)=\sum_{m=-M}^{M}\hat{u}_{k,round(c\cdot\omega_n)+m}\cdot\hat{\phi}(c\cdot\omega_n-\text{round}(c\cdot\omega_n)+m),$$

where the function "round($c\cdot\omega_n$)" produces the nearest integer value of $c\cdot\omega_n$. The round function may be replaced by any other function producing a corresponding integer value, e.g. a floor function (truncation). It is realized that, in this example, $\hat{g}(\phi_k, \omega_n)$ is computed by aggregating weighted contributions of 2M+1 Fourier coefficients $\hat{u}_{k,i}$ around $c\cdot\omega_n$.

The radial interpolation function $\hat{\phi}(\omega)$ may for instance be based on a (windowed) sinc-function, a Gaussian function, a Kaiser-Bessel window function, or any other suitable function with compact support, i.e. which is zero far away from $\omega_n$ so as to reduce the number of aggregations in the computation of $\hat{g}(\phi_k, \omega_n)$. In another alternative, the radial interpolation function $\hat{\phi}(\omega)$ implements a cubic spline interpolation among the Fourier coefficients $\hat{u}_{k,i}$ for data points on the respective radial line $r_k$ in the Fourier domain.

FIG. 7F is an enlarged view of the region of interpolation in FIG. 7E and illustrates the individual equidistant data points $\hat{u}_{k,i}$ (open squares) in the radial vector $\hat{u}_k$. It is realized that the radial interpolation function $\hat{\phi}(\omega)$ defines a respective weight value for a set of data points (Fourier coefficients) in the radial vector $\hat{u}_k$. As used herein, the set of weight values contains individual weight values $[w_{-m}, w_M]$ and is indicated by W. Generally, any number of individual weight values may be used, e.g. 2-10. It should be realized that the weight values W will be different at each radial frequency $\omega_n$. The weight values W may be pre-computed and stored in memory, for retrieval during computation of $\hat{f}(u, v)$ for all grid points within the relevant part of the Fourier domain (cf. circle 60 in FIG. 6). Since the number of grid points may be on the order of 10000-100000, it is realized that the number of weight values may be substantial. In one implementation, weight values W are stored for each frequency-matched data point to be calculated. In another implementation, which may reduce memory usage, weight values W are stored for each individual radial frequency $\omega_n$ to be used when calculating the frequency-matched data points. In a variant, weight values W are stored for individual frequency intervals $\Delta\omega_n$, wherein the individual frequency intervals $\Delta\omega_n$ include plural radial frequencies $\omega_n$. In an alternative implementation, the weight values W are not pre-computed but generated as needed, based on $\hat{\phi}(\omega)$, during computation of $\hat{f}(u, v)$.

In yet another implementation, which may reduce memory usage even further, the weight values W are stored for different values of the residual of $c \cdot \omega_n - \text{round}(c \cdot \omega_n)$, i.e. for different displacements within the equidistant spacing of data points in $\hat{u}_k$. The skilled person realizes that the weight values W are defined by $c \cdot \omega_n - \text{round}(c \cdot \omega_n)$, which yields the same result whenever $c \cdot \omega_n$ is incremented by an integer value. Thus, it may be sufficient to store weight values W for different fractional displacements, e.g. given by d in FIG. 7F. FIG. 7G illustrates a data structure 75 that stores unique combinations of individual weight values $[w_{-M}, w_M]$ in association with different values of d. Any type of suitable data structure may be used, including a table, a hash table, a balanced tree, a linked list, an Iliffe vector, etc. The number of fractional displacements d may be set by the required accuracy of the radial interpolation. When calculating $\hat{g}(\phi_k, \omega_n)$, the radial interpolation step computes the residual $c \cdot \omega_n - \text{round}(c \cdot \omega_n)$, matches the residual to the fractional displacements d in the data structure 75 to identify the closest match, and retrieves the weight values W associated with the closest match. For example, if the data structure contains 100 different values of d, the error in radial frequency will not exceed 0.005.

The following describes symmetry considerations that may be applied to improve processing speed and/or reduce memory footprint when generating $\hat{f}(u, v)$. FIG. 8A illustrates a Cartesian grid in the Fourier domain, defined by the dimension parameters u, v. As explained in the foregoing, the calculation of $\hat{f}(u, v)$ involves two interpolation steps that both operate on the radial frequency given by $\omega_n = |(u, v)|$. The Cartesian grid is known to have four lines of symmetry, as indicated by L1-L4 in FIG. 8A. A line of symmetry of a two-dimensional object allows the object to be folded onto itself into identical halves. It is thus realized that every grid point will be mapped onto seven other grid points by reflections in the lines of symmetry L1-L4. This means that there are groups of eight grid points with identical distance to the origin, as indicated by open circles in FIG. 8A. Each such group of grid points are denoted "symmetric grid points" in the following. It may also be noted that a regular grid with different grid spacing (resolution) in the two dimensions u, v would have two lines of symmetry corresponding to L1 and L2 in FIG. 8A, and would contain groups of four symmetric grid points.

Figure 8B:
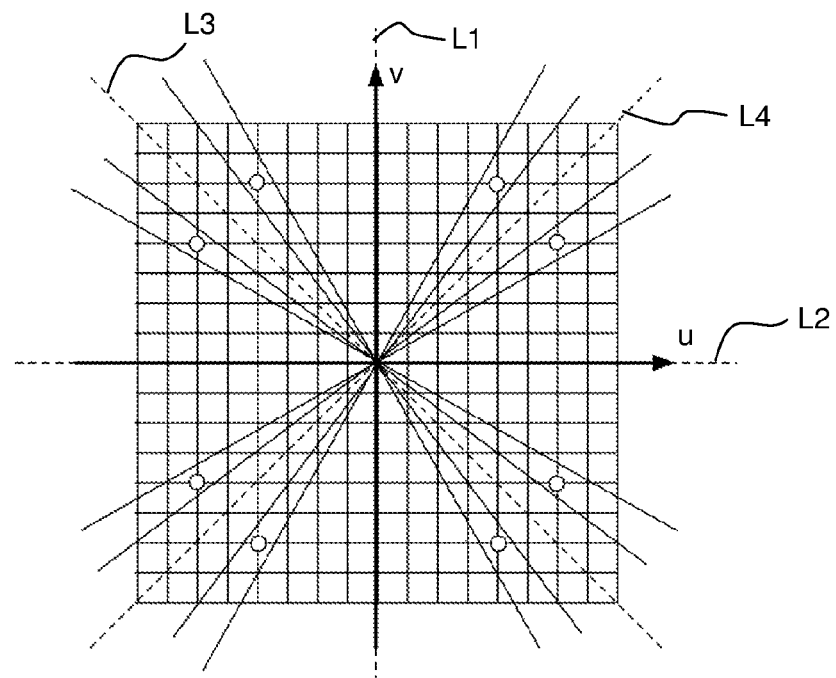

FIG. 8B illustrates pairs of neighboring radial lines around each of the symmetric grid points. In this example, the radial lines are arranged such that each pair of neighboring radial lines around a grid point is mapped onto seven other pairs of neighboring radial lines by reflections in the lines of symmetry L1-L4. Such pairs of neighboring radial lines are denoted "symmetric radial lines" in the following. Recalling that the angle of a radial line in the Fourier domain corresponds to an angle (column) in the sinogram (cf. FIG. 6), it is realized that the arrangement of radial lines in FIG. 8B may be achieved by proper arrangement of detection lines D across the touch surface 1, or by proper design of the matching step for generating columns of projection values in the sample space, as described in relation to FIG. 5.

In an alternative, not shown, the pairs of neighboring radial lines around each of the symmetric grid points are not mapped onto each other, or only partially mapped onto each other, by reflections in the lines of symmetry L1-L4. Such pairs of neighboring radial lines are denoted "associated radial lines" in the following.

Figure 9:
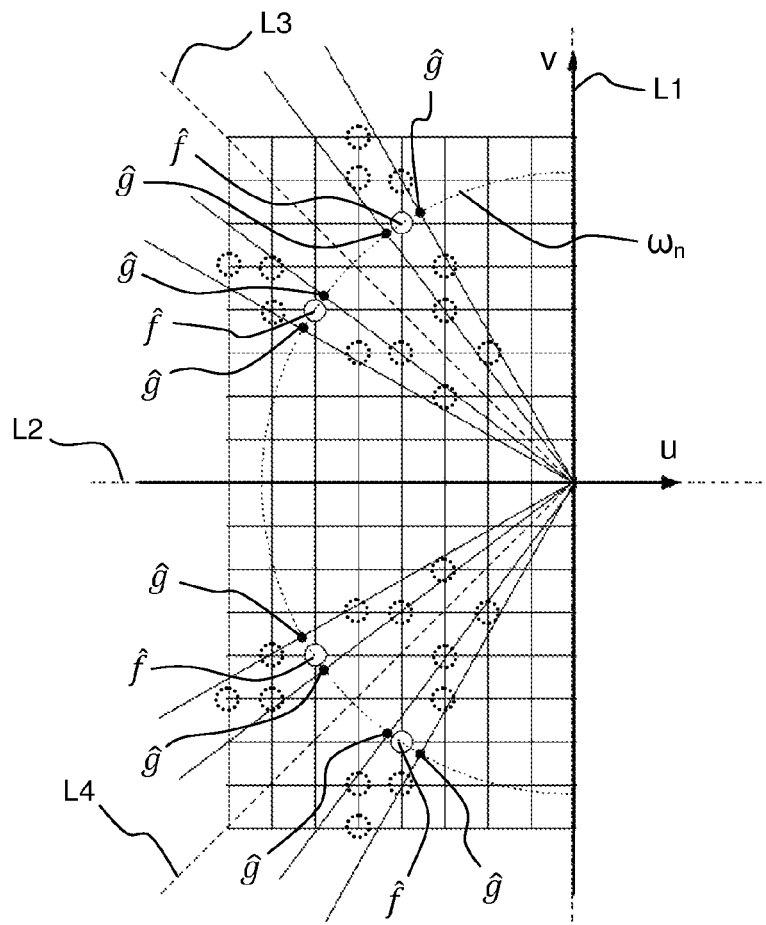
FIG. 9 illustrate radial and angular interpolation for evaluation of four symmetric grid points in a Cartesian grid.

FIG. 9 will be used to explain various optimizations that may be implemented based on the foregoing symmetry considerations.

One optimization, with respect to data storage and data processing, is to utilize the symmetric property of the Fourier transforms and only evaluate and store $\hat{f}(u, v)$ for grid points in a half-plane in the Fourier domain. This optimization is based on the understanding that both the sinogram $g(\phi, s)$ and the interaction pattern $a(x, y)$ are real-valued functions. In the example of FIG. 9, $\hat{f}(u, v)$ is evaluated for grid points in the left half-plane, but any half-plane may be used.

Another optimization may be made with respect to the first interpolation step, i.e. the radial interpolation. FIG. 9 illustrates the frequency-matched data points $\hat{g}$(black dots) that are to be evaluated with respect to a group of symmetric grid points $\hat{f}$(open circles with solid lines). As indicated by the circular arc (dotted lines), the frequency-matched data points $\hat{g}$ are all calculated for the radial frequency $\omega_n$, which means that the same weight values W are applied in the first interpolation step for generating the Fourier coefficients of the frequency-matched data points $\hat{g}$. Thus, technical advantages may be achieved by jointly evaluating the frequency-matched data points $\hat{g}$ for all pairs of neighboring radial lines (either symmetric or associated) around a group of symmetric points. The technical advantages may differ depending on how the weight values W are obtained. If the weight values W are stored as a function of radial frequency, this optimization enables a reduction in the stored number of weight values W, as well as a reduction in the number of memory accesses for retrieval of weight values W. If the weight values W are calculated as needed, the number of calculations may be reduced. If the weight values W are stored as a function of fractional displacement d, this optimization enables a reduction in the number of processing operations evaluating the above-mentioned residual, as well as the number of searches in the data structure and retrievals of weight values W.

Another optimization may be made with respect to the second interpolation step, i.e. the angular interpolation, if the projection values define symmetric radial lines in the Fourier domain. In such a situation, the same interpolation coefficients a, b may be used when evaluating all grid points within a group of symmetric grid points $\hat{f}$. It is realized that the number of different interpolation coefficients a, b may be reduced. This may serve to reduce memory footprint, if the interpolation coefficients a, b are stored in memory. As will described below, the interpolation coefficients a, b may instead be generated as needed, i.e. dynamically. In such implementations, this optimization may serve to reduce the number of processing operations.

Yet another optimization may involve sequentially evaluating all symmetric grid points $\hat{f}$ between the same pair of neighboring radial lines in the Fourier domain, before proceeding to evaluate symmetric grid points between another pair of neighboring radial lines. It should be recalled that the radial vector $\hat{u}_k$ (cf. FIG. 7D) for each radial line is computed by one-dimensional Fourier transformation of the input vector $u_k$. FIG. 9 illustrates the additional grid points (open circles with dotted lines) that fall between the symmetric radial lines, and it is realized that all of these additional grid points may be evaluated based on 8 radial vectors $\hat{u}_k$. Depending on implementation, the radial vectors $\hat{u}_k$ may be generated as needed, i.e. dynamically, or all radial vectors $\hat{u}_k$ may be generated in a preparatory step and stored in memory. Technical advantages may be achieved by evaluating all grid points between one pair of neighboring radial lines, although the technical advantages may differ depending on how the radial vectors $\hat{u}_k$ are obtained. If all radial vectors $\hat{u}_k$ are generated in one batch and stored in memory, the number of memory accesses and retrievals of radial vectors $\hat{u}_k$ may be reduced. If the radial vectors $\hat{u}_k$ are generated dynamically, all grid points that fall between a pair of neighboring radial lines may be evaluated by generating only two radial vectors, thereby reducing the required amount of memory. Thus, if the grid points are evaluated in groups of symmetric grid points, eight radial vectors may first be generated dynamically and held in memory during the evaluation of the symmetric grid points.

Figure 10:
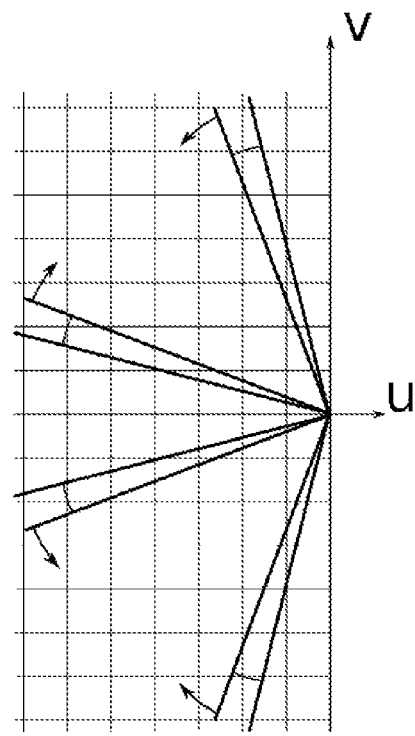
FIG. 10 illustrate a push-broom technique for evaluation of symmetric grid points.

A further optimization may be achieved by using a "push-broom" technique for selecting the grid points to be evaluated, as will be described with reference to FIG. 10. In the illustrated example, it is assumed that the evaluation of grid points starts from the vertical coordinate axis v. Each pair of neighboring radial lines results in evaluation of the grid points that fall between the pair of neighboring radial lines, which may be regarded to define a circle sector ("sector") between themselves. One optimization is achieved by evaluating the grid points for consecutive sectors in an angular direction of the Fourier domain. In the example of FIG. 10, the evaluation proceeds to evaluate the grid points within the next sector in the anti-clockwise direction. Thereby, the new sector shares one radial line with the preceding sector, which is equivalent to re-using one radial vector $\hat{u}_k$. It is realized that this makes it possible to further reduce the need to compute radial vectors $\hat{u}_k$, if computed dynamically, or reduce the number of memory accesses and retrievals if the radial vectors are already computed and stored in memory. If the radial vectors $\hat{u}_k$ are computed dynamically, further optimization of memory usage may be achieved by in-place memory storage of each newly computed radial line, i.e. by overwriting the oldest of the two radial vectors in memory.

If combined with the above-described evaluation of groups of symmetric grid points, and sequential evaluation of all grid points within the sector defined by a pair of radial lines, the push-broom technique will result in evaluation within four sectors that stepwise sweep the Fourier domain as indicated by the arrows in FIG. 10.

Figure 11:
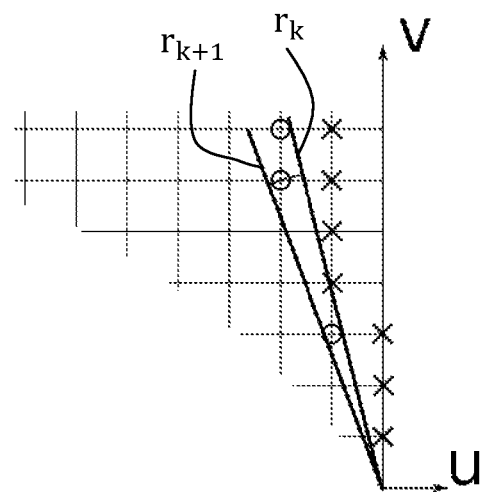
FIG. 11 illustrate a technique of identifying grid points to be evaluated in the push-broom technique of FIG. 10.

It is also possible to use the "push-broom" technique to reduce the need to store information about the grid points that fall between each pair of neighboring radial lines in the Fourier domain. For each sector that has been evaluated, the evaluation process stores the most recently evaluated grid point in each row of the Cartesian grid, or equivalently, the next grid point to be evaluated. FIG. 11 illustrates a current sector, defined between radial lines $r_k$ and $r_{k+1}$, and the crosses indicate the most recently evaluated grid point for each row. The grid points to be evaluated for the current sector are indicated by open circles. These grid points may be identified based on dot products ("scalar products") using the normal vector of the new radial line $r_{k+1}$. Its normal vector is given as $\bar{n}_{k+1}=(-\sin(\phi_{k+1}), \cos(\phi_{k+1}))$, where $\phi_k$ may be stored for each radial line. The evaluation process identifies, for each row, the coordinates (u, v) of the next grid point to be evaluated and computes $d_l=\bar{n}_{k+1}\cdot(u, v)$, where (u, v) is a direction vector ("coordinate vector") from the origin in the Cartesian grid to the next grid point to be evaluated. If $d_l$ is negative, the next grid point falls within the current sector and is processed for evaluation, together with its symmetric grid points. The evaluation process then proceeds to the next row until all rows in FIG. 11 have been processed, whereupon the evaluation process defines a new current sector.

In another optimization, the dot products for both radial lines of a current sector are computed and used to generate the interpolation coefficients a, b for the angular interpolation. In accordance with FIG. 11, the evaluation process identifies, for each row, the coordinate vector (u, v) to the next grid point to be evaluated, and computes not only $d_l=\bar{n}_{k+1}\cdot(u, v)$, but also $d_r=\bar{n}_k\cdot(u, v)$, using the normal vector $\bar{n}_k$ of the radial line $r_k$. It is realized that $d_l$ and $d_r$ are the projections of the coordinate vector (u, v) onto the normal vectors $\bar{n}_k$ and $\bar{n}_{k+1}$. Thereby, the interpolation coefficients a, b may be approximated by computing: $a=d_l/(d_r-d_l)$, and $b=1-a$.

It is readily apparent to the skilled person that the foregoing optimizations are equally applicable if the normal vectors are exchanged for any other direction vectors that consistently represent the directions of the different radial lines, although it may be necessary to modify the criterion for identifying the grid points to be evaluated, and modify the way that the interpolation coefficients are generated dynamically. As an alternative to a dot product, a vector product (cross product) may be computed between a direction vector of the coordinate vector and a direction vector of the current radial line $r_k$ and/or the next radial line $r_{k+1}$. For example, $d_l$ may be computed as $\bar{n}_{k+1}\times\bar{n}_{(u,v)}$, where $\bar{n}_{(u,v)}$ is the normal of the coordinate vector. Many equivalent definitions of the different direction vectors are conceivable.

In another optimization, the push-broom technique enables simple checking that the next grid point does not fall outside the limiting circle 60 (cf. FIG. 6).

It is known in the art to apply a filter to the data in the Fourier domain, before operating the inverse 2D Fourier transformation (IFFT) on the frequency data. For example, the filter may be a low-pass, band-pass or high-pass filter. In one implementation, the filter may e.g. be applied in the step of generating the radial vector $\hat{u}_k$ by multiplying the individual $\hat{u}_{k,i}$ values by a respective radial filter value $H_i$ given by a radial filter function $H(\omega)$. In another implementation, the filter may be applied concurrently with the weights W. It is also conceivable that the radial filter values are embedded in the weights W, e.g. if these are stored as a function of radial frequency. In another implementation, the filter may be applied in the angular interpolation by multiplication by a radial filter value for each radial frequency $\omega_n$: $\hat{f}(u, v) = (a \cdot \hat{g}(\phi_k, \omega_n) \; b \cdot \hat{g}(\phi_{k+1}, \omega_n)) \cdot H(\omega_n)$. Thus, in all of these implementations, the respective radial filter value $H(\omega_n)$ may be applied during the evaluation of each group of symmetric grid points. Thus, the respective radial filter value $H(\omega_n)$ may be applied as a "group-specific filter value". If the radial filter values are stored in memory, this may reduce the stored number of radial filter values and the number of memory accesses for retrieval of radial filter values. If the radial filter values are calculated as needed, the number of calculations may be reduced.

The skilled person recognizes that many of the foregoing optimizations affect inner loops of the evaluation process, i.e. operations that are executed a great number of times when the projection values are converted into Fourier coefficients on a regular grid in the Fourier domain, e.g. one or more times for each grid point in the regular grid. This also implies that even if an optimization leads to a relatively small improvement for an individual processing step in terms of processing efficiency or memory footprint, the improvement of the evaluation process as a whole may still be significant.

It is to be noted that the evaluation process may implement any combination of the foregoing optimizations, or a single one of these optimizations.

4. Operation and Hardware

FIG. 12A illustrates an embodiment of a method for touch data extraction in the touch-sensitive apparatus 100 of FIG. 1A. The method involves a sequence of steps 102-110 that are repeatedly executed by the data processing device 10. Each sequence of steps 102-110 forms a "frame".

Each frame starts by a data collection step 102, in which measurement values are sampled from the sensors 3. Step 102 results in one projection value for each detection line. It may be noted that the measurement values may, but need not, be acquired for all available detection lines in the apparatus 100. Step 102 may also include pre-processing of the measurement values, e.g. filtering for noise reduction, conversion of measurement values into transmission values (or equivalently, attenuation values), conversion into logarithmic values, etc. Step 102 may also involve processing so as to obtain the projection values in the form of matched samples for fictitious detection lines, e.g. as mentioned above with reference to WO2011/139213.

In a transformation step 104, the projection values are processed to generate frequency data consisting of Fourier coefficients for data points on a regular grid in the Fourier domain. As noted above, step 104 may generate the frequency data for only a half-plane in the Fourier domain.

In an inversion step 106, a 2D inverse Fourier transformation is performed on the frequency data. As is well-known in the art, step 106 may be implemented as two consecutive runs of a 1D inverse Fourier transform: a first run (pass) with respect to one direction (u or v), so as to generate partially transformed data, and a second run (pass) on the partially transformed data with respect to other direction (v or u), so as to generate the interaction pattern within the extent of the touch surface.

In an extraction step 108, the interaction pattern is processed for identification of touch-related features and extraction of touch data. Any known technique may be used for isolating true (actual) touches within the interaction pattern. For example, ordinary blob detection and tracking techniques may be used for finding the actual touches, including thresholding, clustering, edge detection, shape matching, etc. Any available touch data may be extracted, including but not limited to x, y coordinates, areas and shapes of the touches.

In step 110, the extracted touch data is output, and the process returns to the data collection step 102.

It is to be understood that one or more of steps 102-110 may be effected concurrently. For example, the data collection step 102 of a subsequent frame may be initiated concurrently with any of steps 104-110.

Figure 12B:
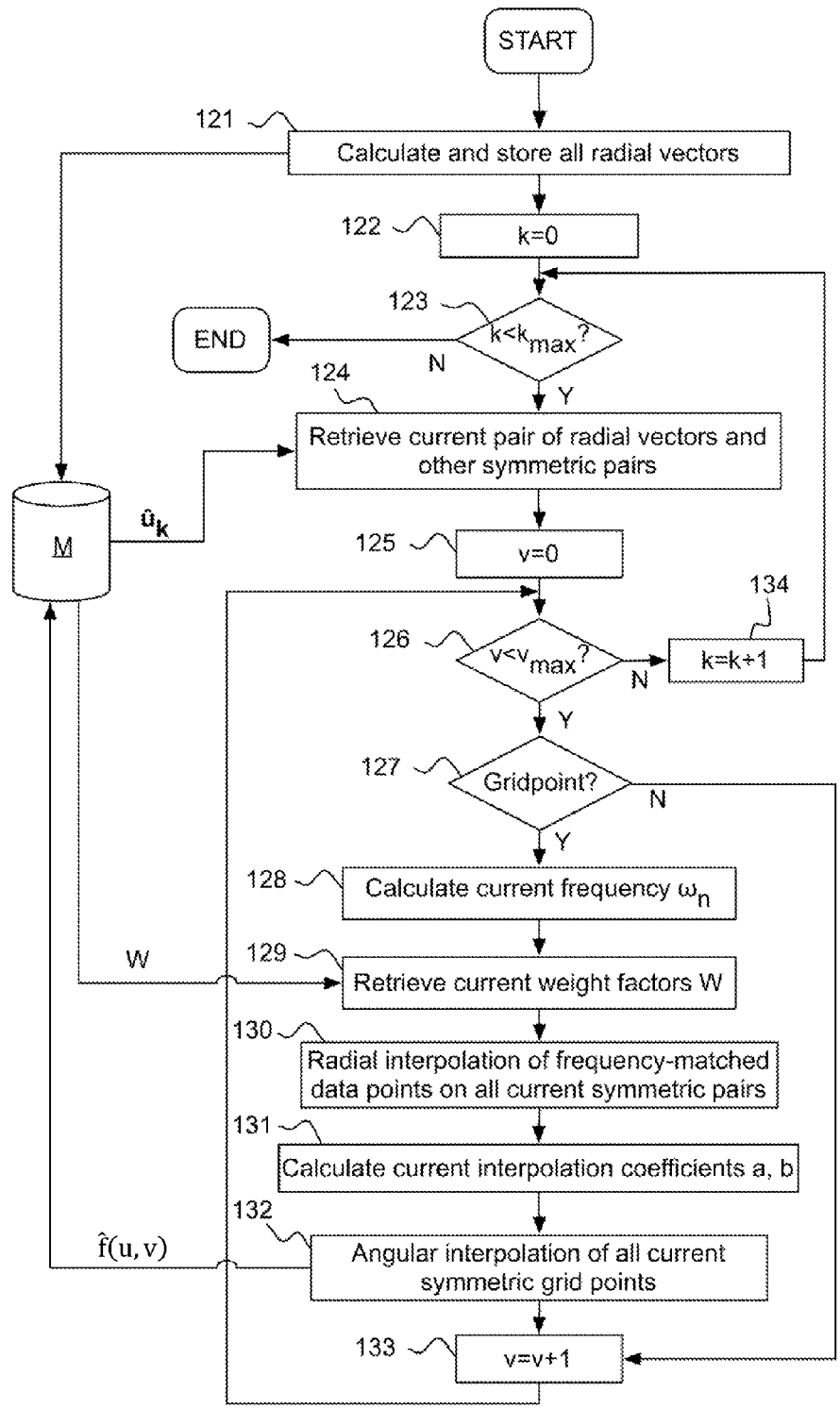

FIG. 12B illustrates an example process that implements the transformation step 104 and includes at least some of the optimizations described in Section 3. The process starts by a step 121 of processing the projection values (obtained by step 102 in FIG. 12A) to generate all radial vectors, by operating a 1D FFT on the projection values (matched samples) with respect to the s variable. Step 121 stores the radial vectors in memory M. Step 122 initiates an angular counter (k), and step 123 checks that the current value of the angular counter has not reached a maximum value ($k_{max}$). Step 124 retrieves, from memory M, the radial vectors $\hat{u}_k$ for a current set of pairs of neighboring radial lines (symmetric radial lines) given by the current value of the angular counter. In the example of FIG. 10, this corresponds to retrieving four pairs of radial vectors, which define a current sector and three symmetric sectors in the Fourier domain. Step 125 initiates a row counter (v), and iterates over a sequence of steps 126-133 to evaluate all grid points within the four sectors. Step 126 checks that the current value of the row counter has not reached a maximum value ($v_{max}$), and proceeds to step 127 which checks if there is a grid point in the current sector, e.g. by calculating and evaluating $d_l$ as described with reference to FIG. 11. If no grid point is identified the process proceeds to step 133, which increments the row counter and returns to step 126. If there is a grid point, the process proceeds to step 128, which calculates the current radial frequency $\omega_n$ for the grid point. Step 129 then retrieves the current weight factors W from memory M, e.g. by searching the data structure 75 (FIG. 7G). In step 130, the current weight factors W are applied to the four pairs of radial vectors $\hat{u}_k$ to evaluate eight frequency-matched data points $\hat{g}$ on the current set of pairs of neighboring radial lines by radial interpolation. In step 131, the current interpolation coefficients are obtained, e.g. as a function of $d_l$ and $d_r$. In step 132, the interpolation coefficients are applied to the eight pairs of frequency-matched data points $\hat{g}$ so as to generate the Fourier coefficients $\hat{f}$ at the four symmetric grid points by angular interpolation. The Fourier coefficients $\hat{f}$ at the four symmetric grid points are stored in memory M (for subsequent retrieval by step 106 in FIG. 12A). In step 133, the row counter is incremented and the process returns to step 126. When step 126 determines that the row counter v exceeds $v_{max}$, i.e. when all rows have been evaluated (cf. FIG. 11), the process proceeds to step 134, which increments the angular counter k and returns to step 123 so as to repeat the processing for the next sector in the anti-clockwise direction, and its symmetric sectors (cf. FIG. 10). This means that step 124 retains four radial vectors and retrieves four new radial vectors from memory M. When step 124 determines that the angular counter k exceeds $k_{max}$, i.e. when all sectors have been evaluated, all grid points have been evaluated and the process ends.

FIG. 12C shows an example of a device 10 configured to implement the process in FIGS. 12A-12B. The device 10 includes an input 10A for receiving the output signal. The device 10 further includes a data collection element (or means) 202 for generating the current projection values, a transformation element (or means) 204 for generating frequency data on a regular grid, an inversion element (or means) 206 for generating the interaction pattern by 2D inverse Fourier transformation of the frequency data, and an output 10B for outputting the interaction values. In the example of FIG. 12C, the extraction of touch data is carried out by a separate device 10' which is connected to receive the interaction values from the device 10. In the example of FIG. 12C, the transformation element 204 comprises an element (or means) 220 for calculating and storing all radial vectors, a sector processing element (or means) 221 for sequentially retrieving and processing pairs of radial vectors according to an predefined ordering, by means of a grid point evaluation element (or means) 222, which is configured to evaluate a set of symmetric grid points by radial interpolation and angular interpolation for each grid point between a pair of radial vectors.

The device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between element/means and particular pieces of hardware or software routines. One piece of hardware sometimes comprises different means/elements. For example, a processing unit may serve as one element/means when executing one instruction, but serve as another element/means when executing another instruction. In addition, one element/means may be implemented by one instruction in some cases, but by a plurality of instructions in some other cases. Naturally, it is conceivable that one or more elements (means) are implemented entirely by analog hardware components.

The software controlled device 10 may include one or more processing units (cf. 13 in FIG. 1A), e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory (cf. 14 in FIG. 1A) and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software and any predefined data needed during execution, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The device 10 may include one or more communication interfaces, such as a serial interface, a parallel interface, a USB interface, a wireless interface, a network adapter, etc, as well as one or more data acquisition devices, such as an AD converter. The special-purpose software may be provided to the device 10 on any suitable computer-readable medium, including a record medium, and a read-only memory.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, the touch-sensitive apparatus may have any conceivable arrangement of detection lines. Further, the generation of matched samples may be omitted, e.g. if the apparatus 100 is designed with a matching arrangement of detection lines, or the matched samples may be generated by simply assigning each projection value to the nearest matched sample. Although the matched samples typically define lines of sampling points with respect to the angle parameter ϕ, the matched samples within each line may have any spacing (uniform or non-uniform), and the lines of sampling points may have any angular spacing (uniform or non-uniform).

Although all examples are given with reference to a Cartesian grid, the skilled person realizes that the above-described optimizations are equally applicable when the Fourier coefficients are generated at grid points in other types of regular grids.

It should be understood that the groups of symmetric grid points need not include all the symmetric grid points. Gains in performance may be achieved as long the groups include at least two symmetric grid points, and preferably at least two symmetric grid points in one half-plane of the Fourier domain.

Furthermore, corresponding gains in performance may be achieved by sequentially processing groups of grid points that include non-symmetric grid points, i.e. grid points that are not mapped onto each other by reflections in lines of symmetry, as long as all grid points in the respective group have the same radial frequency, i.e. the same distance to the origin in the regular grid. Such groups of grid points may also comprise a combination of symmetric and non-symmetric grid points with the same radial frequency. One advantage of using groups of symmetric grid points is that all grid points within all groups may be identified by simple arithmetic operations, such as reflection operations. Thereby, the groups may be identified based on less pre-stored information and/or fewer memory accesses and/or fewer processing operations.

The invention claimed is:

1. A method of enabling touch determination based on an output signal from a touch-sensitive apparatus, the touch-sensitive apparatus including a touch surface and being configured to propagate signals across the touch surface, said method comprising:
  processing the output signal to generate data samples indicative of transmitted signal energy on parallel detection lines at a number of different angles across the touch surface, the data samples generated to correspond to Fourier coefficients at data points on a plurality of radial lines that extend through an origin in a regular grid in a Fourier domain;
  processing the data samples to generate interpolated Fourier coefficients at grid points in the regular grid;
  operating a two-dimensional inverse Fourier transform on the interpolated Fourier coefficients to generate an interaction pattern indicative of touch interaction on the touch surface;
  wherein pairs of neighboring radial lines define sectors in the regular grid;
  wherein the processing the data samples includes processing the sectors in order to generate the interpolated Fourier coefficients; and
  wherein a current sector among the sectors is processed by identifying current grid points within the current sector, and sequentially generating, based on the current grid points, the interpolated Fourier coefficients for individual groups of grid points, each individual group including grid points having equal distance to the origin in the regular grid.

2. The method of claim 1, wherein the grid points in each individual group are mapped onto each other by one or more lines of symmetry in the regular grid.

3. The method of claim 1, wherein the processing the data samples further comprises:

processing the data samples to generate the Fourier coefficients at the data points on the plurality of radial lines; and processing the Fourier coefficients of the data points on the plurality of radial lines by interpolation to generate the interpolated Fourier coefficients.

4. The method of claim 1, wherein the sectors are arranged such that there is a common radial line between consecutive sectors.

5. The method of claim 1, wherein the processing the sectors results in stepwise generation of the interpolated Fourier coefficients along a plurality of grid lines that extend in a first dimension of the regular grid;

each grid line includes a most recently generated Fourier coefficient that defines a forthcoming grid point; and the identifying current grid points includes
  tracking the forthcoming grid points for the plurality of grid lines,
  determining a direction vector of a common radial line between the current sector and a forthcoming sector in the predetermined order,
  determining direction vectors of radial grid point lines from the origin in the regular grid to each of the forthcoming grid points, and
  identifying the current grid points among the forthcoming grid points by comparing the direction vector of the common radial line to the direction vectors of the radial grid point lines.

6. The method of claim 5, wherein the comparing the direction vector of the common radial line to the direction vectors of the radial grid point lines comprises:

calculating a product between the direction vector of the common radial line and each of the direction vectors of the radial grid point lines; and identifying the current grid points based on the calculated products.

7. The method of claim 6, wherein at least one of said direction vector of the common radial line and each of the direction vectors of the radial grid point lines is a normal vector; and said product is one of a dot product and a vector product.

8. The method of claim 1, wherein the grid points are located in a half-plane of the Fourier domain.

9. The method of claim 1, wherein the data samples are generated as a function of light that has propagated along light paths inside a light transmissive panel by internal reflections between a front surface and a rear surface; and the front surface defines the touch surface and allows the propagating light to be attenuated by interaction with touching objects.

10. The method of claim 1, wherein the processing the output signal comprises:

acquiring measurement values for a set of actual detection lines that extend across the touch surface; and processing the measurement values to generate the data samples for fictitious detection lines that match said parallel detection lines.

11. A method of enabling touch determination based on an output signal from a touch-sensitive apparatus, the touch-sensitive apparatus comprising a touch surface and being configured to propagate signals across the touch surface, said method comprising:

processing the output signal to generate data samples indicative of transmitted signal energy on parallel detection lines at a number of different angles across the touch surface, the data samples generated to correspond to Fourier coefficients at data points on a plurality of radial lines that extend through an origin in a regular grid in a Fourier domain;

processing the data samples to generate interpolated Fourier coefficients at grid points in the regular grid;

operating a two-dimensional inverse Fourier transform on the interpolated Fourier coefficients to generate an interaction pattern indicative of touch interaction on the touch surface;

wherein the processing the data samples includes sequentially generating the interpolated Fourier coefficients for individual groups of grid points; each individual group including grid points having equal distance to the origin in the regular grid; and wherein the interpolated Fourier coefficient at each grid point in an individual group of grid points is generated by
  obtaining the Fourier coefficients for data points on a pair of neighboring radial lines,
  performing a first interpolation to generate temporary Fourier coefficients on the pair of neighboring radial lines at positions with said equal distance to the origin, and
  performing a second interpolation between the temporary Fourier coefficients on the pair of neighboring radial lines to generate the interpolated Fourier coefficient at the grid point.

12. The method of claim 11, wherein the temporary Fourier coefficients on each radial line in the pair of neighboring radial lines are generated by aggregating the Fourier coefficients for the data points on the radial line while applying a set of weight factors; and a same set of weight factors is applied for generating the temporary Fourier coefficients for each grid point in the individual group of grid points.

13. The method of claim 11, wherein the processing the output signal generates the data samples such that at least some of the radial lines are mapped onto each other by one or more lines of symmetry in the regular grid.

14. The method of claim 13, wherein said at least some of the radial lines that are mapped onto each other include pairs of neighboring radial lines.

15. The method of claim 11, wherein the performing a second interpolation comprises:

applying a set of interpolation coefficients to the temporary Fourier coefficients on the pair of neighboring radial lines to generate the interpolated Fourier coefficient at the grid point; wherein a same set of interpolation coefficients is applied when generating the interpolated Fourier coefficient at each grid point in the individual group of grid points.

16. The method of claim 11, wherein the performing a second interpolation comprises:
- determining direction vectors of the pair of neighboring radial lines; and
- generating the interpolated Fourier coefficient at the grid point as a function of the temporary Fourier coefficients and products between each of the direction vectors of the pair of neighboring radial lines and a direction vector of a radial grid point line that extends from the origin in the regular grid to the grid point.

17. The method of claim 11, further comprising:
- applying a group-specific filter value when generating the interpolated Fourier coefficients for the grid points in each individual group, the group-specific filter value associated with a given radial frequency of a radial filter function.

18. A non-transitory computer-readable medium storing computer code which, when executed on a data-processing system, causes the data-processing system to carry out the method of claim 1.

19. A device for enabling touch determination based on an output signal of a touch-sensitive apparatus, the touch-sensitive apparatus including a touch surface and being configured to propagate signals across the touch surface, said device comprising:
- at least one processor configured to execute computer-readable instructions to
  - process the output signal to generate data samples indicative of transmitted signal energy on parallel detection lines at a number of different angles across the touch surface, the data samples generated to correspond to Fourier coefficients at data points on a plurality of radial lines that extend through an origin in a regular grid in a Fourier domain
  - process the data samples to generate interpolated Fourier coefficients at grid points in the regular grid, and
  - operate a two-dimensional inverse Fourier transform on the interpolated Fourier coefficients to generate an interaction pattern indicative of touch interaction on the touch surface,
- wherein pairs of neighboring radial lines define sectors in the regular grid,
- wherein the data samples are processed by processing the sectors in order to generate the interpolated Fourier coefficients, and
- wherein a current sector among the sectors is processed by
  - identifying current grid points within the current sector, and
  - sequentially generating, based on the current grid points, the interpolated Fourier coefficients for individual groups of grid points, each individual group including grid points having equal distance to the origin in the regular grid.

* * * * *